J. M. SAGER.
DUST TRAP FOR HOT AIR FURNACES.
APPLICATION FILED NOV. 9, 1907.
899,810.
Patented Sept. 29, 1908.
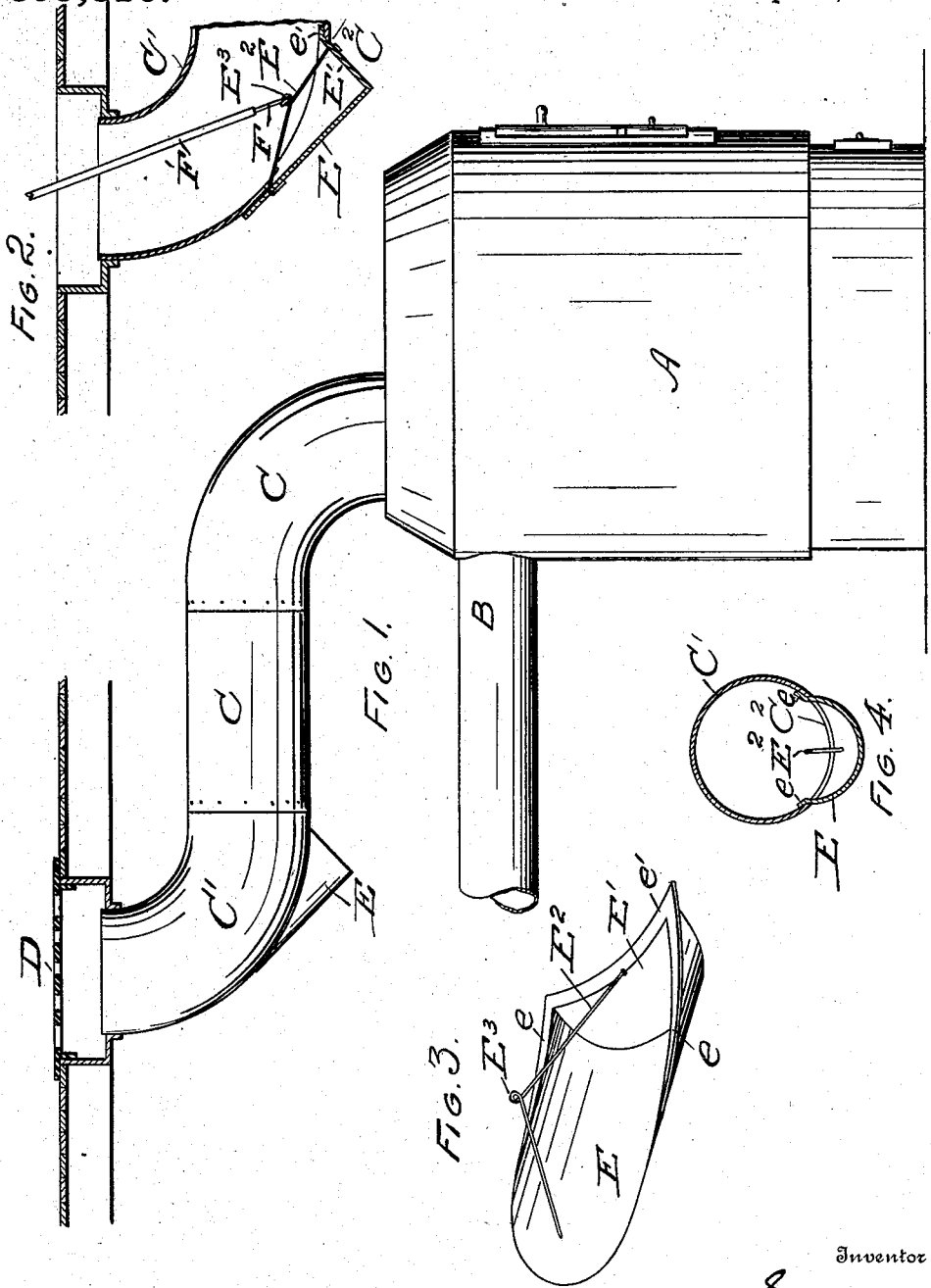
Witnesses
P. H. Shoemaker
Grace E. Wynkoop
Inventor
John M. Sager
By S. E. Thomas
Attorney

UNITED STATES PATENT OFFICE.

JOHN M. SAGER, OF BURTLAKE, MICHIGAN.

DUST-TRAP FOR HOT-AIR FURNACES.

No. 899,810.

Specification of Letters Patent.

Patented Sept. 29, 1908.

Application filed November 9, 1907. Serial No. 401,389.

*To all whom it may concern:*

Be it known that I, JOHN M. SAGER, citizen of the United States, residing at Burtlake, county of Cheboygan, State of Michigan, have invented a certain new and useful Improvement in Dust-Traps for Hot-Air Furnaces, and declare the following to be a full, clear, and exact description of the same, such as will enable others skilled in the art to which it pertains to make and use the same, reference being had to the accompanying drawings, which form a part of this specification.

My invention relates to an improvement in dust traps for hot air furnace pipes shown in the accompanying drawings and more particularly pointed out in the following specification and claims.

The object of my invention is to provide a device whereby the dust which naturally settles through the register of hot air furnaces will be caught and held until such time as it may be convenient to remove the same;—the construction being such that it becomes an integral part of the hot air pipe itself.

A feature of the construction is that it may be removed and replaced for the purpose of discharging the dust from above the floor line.

In the drawings forming part of this specification: Figure 1 is an elevation with parts in section, of a hot air furnace installation;—showing the dust trap as it appears when installed in the hot air supply pipe. Fig. 2 is a sectional view through the hot air supply pipe and floor connection, showing the trap in position and the means employed for replacing or removing the trap from the pipe. Fig. 3 is a perspective view of the trap. Fig 4 is a cross-sectional view through the hot air pipe and trap, showing the manner in which the trap is supported by the pipe.

Referring to the letters of reference shown on the drawings: A denotes the furnace. B the smoke flue, C the hot air pipe, C' an elbow in the hot air pipe, and D is a floor register.

$C^2$ is an opening cut in the elbow C' in which is set the dust trap E. The dust trap E is semi circular in cross-section and has projecting flanges $e$ running the length of the device designed to engage the inner face of the pipe wall, (see Fig. 4) by means of which it is supported in position. E' is an end wall from which also projects a flange $e'$ which rests on the inside of the pipe—see Fig. 2—when the device is in place.

$E^2$ is a bail, the ends of which are secured to the trap the purpose being to provide means whereby the trap may be installed or removed from the pipe as required. The bail $E^2$ is preferably provided with an eye $E^3$ designed to receive the hook F attached to the pole F' by means of which the trap may be removed or replaced through the register opening in the floor.

It will be seen that when the trap is installed its upper end rests beneath the outside of the hot air pipe, its lower wall forming a tangent to the arc of the pipe elbow and out of the line of the balance of the pipe leading to the furnace:—whereby any dust or dirt that may fall through the register opening will be guided into the trap and out of the path of incoming hot air. Thus dust, dirt or other matter entering the hot air pipe will slide along the bottom of the trap until arrested by its end wall E' where it will remain until the trap is removed. It will thus be seen that the dust which would otherwise naturally gravitate down the furnace pipe until caught by the ascending hot air to be by it projected into the rooms, will by the employment of my device be deflected out of the path of heated air and into a receptacle from which it may be removed when convenient.

Having thus described my invention, what I claim is:—

1. The combination with a hot air pipe for furnaces provided with an opening, of a dust receptacle, the sides and one end of the receptacle having flanges for projection into the pipe to engage the corresponding sides and end of said opening to support the receptacle.

2. The combination with a hot air pipe for furnaces provided with an opening of a dust collector having flanges for projection into the pipe to support the receptacle upon an incline over the opening.

3. The combination with a hot air pipe for furnaces provided with an opening, of a dust collector having flanges for projection into the pipe to support the receptacle over the opening, and a bail connected to the receptacle.

4. In an appliance for the purpose specified, a furnace pipe having an opening in its lower wall, and a removable dust receptacle set in said opening having projecting flanges designed to rest upon the wall of the pipe, whereby the dust receptacle is supported in said pipe opening.

5. In an appliance for the purpose specified, an elbow pipe for hot air furnaces having an opening in its lower wall, and a removable dust receptacle set in said opening having flanges designed to rest upon the wall of the pipe whereby it is supported in said opening, the lower wall of said dust receptacle being on a tangent to the arc formed by the elbow when the parts are in position whereby the dust upon gravitating into said receptacle is entrapped and supported out of the path of the ascending hot air.

6. In an appliance for the purpose specified, an elbow pipe for hot air furnaces having an opening in its lower wall, a removable dust receptacle set in said opening having flanges designed to rest upon the wall of the pipe whereby it is supported in said opening, the lower wall of said dust receptacle being on a tangent to the arc formed by the elbow when the parts are in position, and a bail secured to said dust receptacle, substantially as and for the purpose specified.

7. As an article of manufacture, a receptacle having side walls and one end wall, said side and end walls each having an outwardly directed supporting flange, and a bail connected at one end to said end wall and having its opposite end connected to the body of the receptacle in advance of the opposite end thereof.

8. In a hot air pipe for furnaces provided with an opening, a dust collector having flanges for projection into the pipe to support the receptacle over the opening, and a bail connected to the receptacle and projecting into the pipe through said opening.

In testimony whereof, I sign this specification in the presence of two witnesses.

JOHN M. SAGER.

Witnesses:
E. E. GILBERT,
C. A. E. FISK.